UNITED STATES PATENT OFFICE.

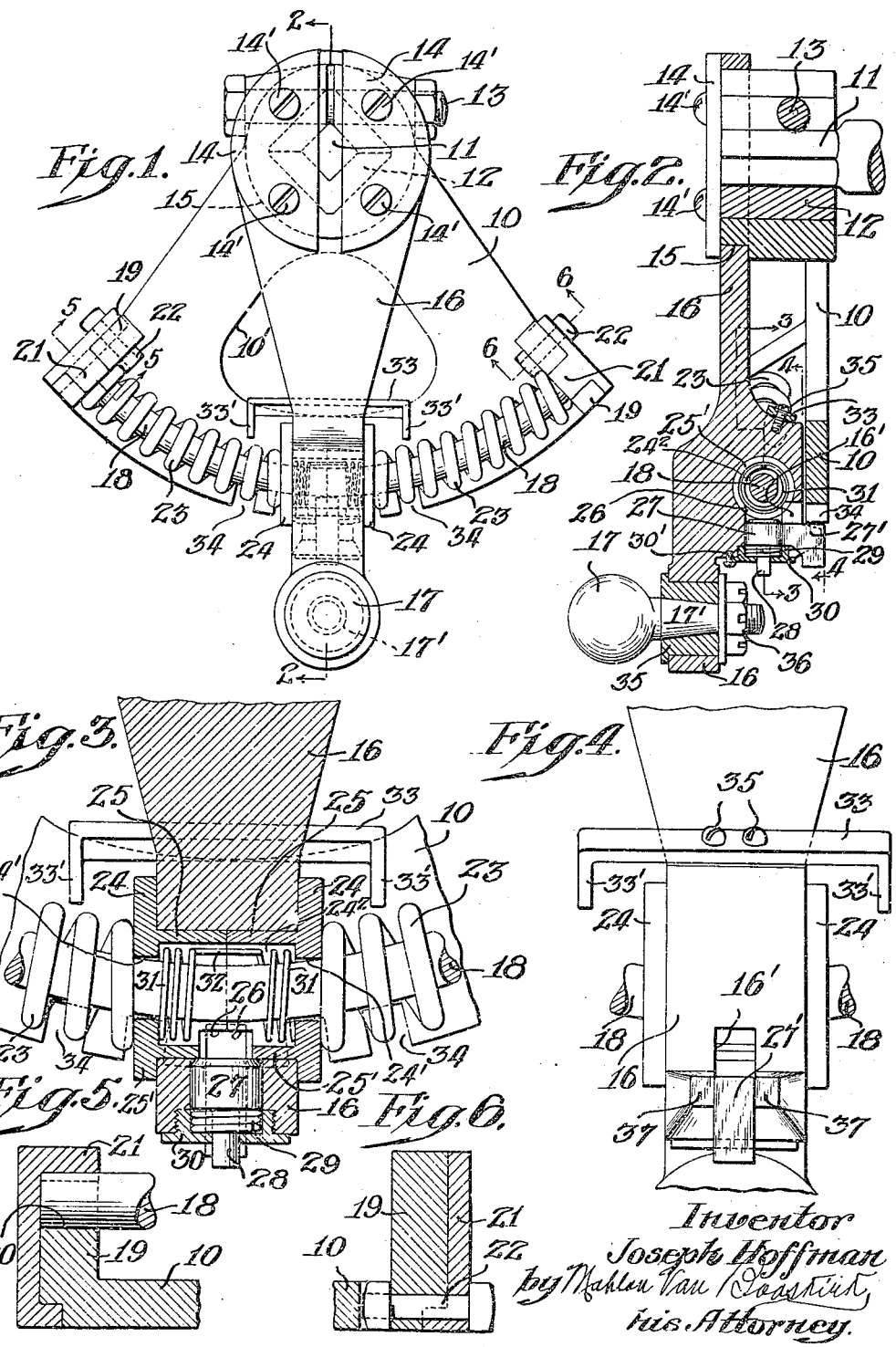

JOSEPH HOFFMAN, OF CAMDEN, NEW JERSEY.

SAFETY LATCH FOR STEERING CONTROLLERS.

1,421,475.   Specification of Letters Patent.   Patented July 4, 1922.

Application filed June 15, 1921. Serial No. 477,693.

*To all whom it may concern:*

Be it known that I, JOSEPH HOFFMAN, a citizen of the United States, residing at Camden, in the county of Camden and State of New Jersey, have invented certain new and useful Improvements in Safety Latches for Steering Controllers, of which the following is a specification.

This invention relates to safety latches for steering controllers.

The said invention is an improvement upon Letters Patent #1,350,285, issued to Philip A. Weigel, inventor, August 17th, 1920, for an improvement in steering controllers.

The principal object of the present invention is to provide means in a steering controlling device for automobiles, substantially as described in the above cited patent, whereby in the event that said steering mechanism should become inoperable by reason of the breaking of a spring thereof, a safety latch will automatically operate therewith whereby the automobile may still be operated in the conventional manner now in vogue.

This object and other advantageous ends I attain by means of the mechanism hereinafter described, reference to be had to the accompanying drawings, in which:—

Figure 1 is a front elevational view of the device;

Figure 2 is a sectional elevational view on line 2—2 of Fig. 1;

Figure 3 is a sectional view on line 3—3 of Fig. 2;

Figure 4 is likewise a sectional view on line 4—4 of Fig. 2;

Figure 5 is a detail sectional view on line 5—5 of Fig. 1; and

Figure 6 is likewise a detail sectional view on line 6—6 of Fig. 1.

Referring now more particularly to the several figures of the drawing wherein similar reference characters indicate like parts in all of the views, the numeral 10 represents a sector lever which is mounted on a stud shaft 11 adapted to be journaled in the main frame of an automobile.

The said sector lever 10 is analogous to the T lever $i$ illustrated and described in Letters Patent #1,350,285 cited; a portion 10′ may be cut out of said lever 10 as illustrated in Fig. 1 to lessen the weight thereof.

In order that the sector lever 10 may be mounted on shafts of varying diameters the means of mounting the same as shown in Figs. 1 and 2 of the drawing are utilized; such means being briefly as follows:

The sector lever 10 is split in the upper portion thereof into two equal sectors and semi-circular cover plates 14—14 are positioned against the front of each sector by means of screws 14′—14′. The shaft 11 is swaged from an annular shaft to a square shaft and a bushing 12 fitted over said square portion of said shaft. As the plates 14—14 are brought together by means of the bolt 13 therethrough, the lever 10 may be readily and firmly mounted on said shaft 11, irrespective of the diameter of said shaft.

Mounted on the sector lever 10 at its support and co-axially therewith is the ball lever 16. A circular portion 15 is cut out of said lever 16, as illustrated, to permit the positioning of the ball lever 16 on the lever 10.

The said ball lever 16 is provided with the through opening $24^2$ therethrough as shown and cupped washers 24—24 are positioned on either side of said lateral opening 24′ and against the sides of said lever 16.

The washers 24—24 are provided with inwardly extending semi-circular sectors 25—25 adjacent the upper ends thereof and the inwardly extending semi-circular sectors 25′—25′ adjacent the lower ends thereof, so that when assembled and in position they form a cup within the through opening $24^2$ in the lever 16. The sectors 25′—25′, however, are cupped or recessed as at 26 to permit of the upward travel of the bolt 27.

Openings 24′—24′ are provided through the washers 24—24 to permit the passing therethrough and through the opening $24^2$ in the lever 10 of a bar 18.

Projections 19—19 are provided on the sector lever 10 as illustrated and the bar 18 is secured at either end in slots 20—20 in said projections 19—19 by means of the caps 21—21 being bolted thereagainst by means of the bolts 22—22.

The bar 18 is here shown extending in the form of an ascending arc instead of extending horizontally as in the Patent #1,350,285 cited.

Spiral springs 23—23 are coiled around the bar 18 and are adapted for compression between the caps 21—21 and the outer walls of the washers 24—24 as particularly illustrated in Fig. 1 of the drawing.

Positioned within the cupped portions of the washers 24—24 within the opening 24² in the lever 16 and around the bar 18 is a spiral spring 31. An opening is provided within the central portion of this spring 31 but the same is made continuous by the connecting bar 32 across the top thereof, and said spring 31 is adapted for compression against the inner walls of the washers 24—24.

A bolt 27 having the downwardly extending shank 28 and an integral latch 27' is positioned in the lower portion of the ball lever 16 and normally abuts against the bases of the sectors 25'—25' of the washers 24—24. A spiral spring 29 is coiled around the shank 28 of the bolt 27 and is adapted for compression between the base of the bolt 27 and a cap secured beneath said spring 29 in the lever 16. This cap 30 is threaded into said lever 16 and is held firmly in place by means of a set screw 30'.

Notches or recesses 34 are provided in the sector lever, as illustrated, to engage the latch 27' of the bolt 27.

In operation:—The ball lever 16 is mounted on the sector lever 10 at its support and co-axially therewith and the sector lever 10 is mounted on the shaft 11 which is adapted to be journaled to the main frame of an automobile. Means are shown and hereinbefore described whereby said sector lever 10 may be mounted on shafts of varying diameters.

The ball lever 16 terminates in an opening in which a ball 17 having a tapering shank 17' is positioned and secured by means of a bushing 35 and a bolt 36 as particularly illustrated in Fig. 2 of the drawing. This will permit of various adjustments in connecting same with a connecting rod to the swivel of the front axle of an automobile.

The operation of the steering controller comprising a T-lever, analogous to the present sector lever 10, ball lever 16 and the springs 23—23 is described in detail in the Letters Patent #1,350,285 cited.

The present invention resides in the safety latch mechanism which becomes operable in the event that either or both of the springs 23—23 should break.

When a spring 23 breaks the compression thereof is obviously relaxed whereby the spring 31 can exert its pressure unopposed against the washers 24—24 causing said washers 24—24 to travel outwardly. The pressure of the springs 23—23 being normally greater than that of the spring 31. The spring 23 to break will normally be the spring that is under pressure, hence there will be no compression of the opposite spring 23 against the opposite washer 24. The spring 31, however, by reason of its novel construction as hereinbefore described exerts an equal pressure against both washers 24—24 at all times irrespective of the compression of the springs 23.

As the washers 24—24 travel outwardly the integral sectors 25—25 and 25'—25' will also travel outwardly whereby the bolt 27 which normally abuts beneath the bases of the sectors 25'—25' is released and the pressure of the spring 29 forces said bolt 27 upwardly through the cupped opening 26 permitting the integral latch 27' on said bolt 27 to engage a notch or recess 34 in the sector lever 10. An opening 16' being provided in the lever 16 for the passage of the latch 27'. The automobile steering mechanism thereby being operable in the conventional way as if the steering controlling means hereinbefore mentioned were not connected thereto.

Projections 37—37 extend from the lever 16 and serve as guide prongs for guiding the bolt 27 in its upward travel.

To prevent the washers 24—24 from moving outwardly by the pressure of the spring 31 beyond a determinate point a limit stop 33 is provided. Said limit stop 33 comprises a bar secured to the lever 16 by means of the screws 35 as illustrated and having the downwardly extending arms against which the washers 24—24 impinge when the desired limit of their travel is reached.

It will now be apparent that I have devised a novel and useful construction which embodies the features of advantage enumerated as desirable in the statement of the invention and the above description, and while I have in the present instance shown and described the preferred embodiment thereof which has been found in practice to give satisfactory and reliable results, it is to be understood that the same is susceptible of modification in various particulars without departing from the spirit and scope of the invention or sacrificing any of its advantages.

Having thus described my invention what I claim as new and desire to secure by Letters Patent is:—

1. In a steering controlling device of the class described, a sector lever, a ball lever mounted on said sector lever at its support and co-axially therewith, springs, positioned on said sector lever, adapted for compression between said sector lever and said ball lever and latch mechanism operably positioned within said ball lever adapted to engage said sector lever upon the breaking of a spring thereon, substantially as described.

2. In a steering controlling device of the class described, a sector lever, a ball lever mounted on said sector lever at its support and co-axially therewith, springs, positioned on said sector lever, adapted for compression between said sector lever and said ball lever, latch mechanism operably positioned within said ball lever adapted to engage said sector lever upon the breaking of a spring thereon and means for mounting said sector lever upon shafts of varying diameters, substantially as described.

3. In a steering controlling device of the class described, a sector lever, a ball lever mounted on said sector lever at its support and co-axially therewith, springs, positioned on said sector lever, adapted for compression between said sector lever and said ball lever, an opening within the ball lever, a cupped washer of two equal sectors positioned in said opening, said washer having an opening in the base thereof, a latch bolt normally positioned beneath the base of said washer, compression means positioned in said lever opening of less pressure against the inner walls of the said washer than the pressure of the springs on the sector lever against the outer walls of said washer whereby said latch bolt is released from contact with the base of said washer upon the breaking of a sector lever spring and compression means beneath said latch bolt to force it upwardly through the opening in said washer to seat within a recess provided in the said sector lever, substantially as described.

4. In a steering controlling device of the class described, a sector lever, a ball lever mounted on said sector lever at its support and co-axially therewith, springs, positioned on said sector lever, adapted for compression between said sector lever and said ball lever, an opening within the ball lever, a cupped washer of two equal sectors positioned in said opening, said washer having an opening in the base thereof, a latch bolt normally positioned beneath the base of said washer, compression means within said lever to cause the sectors of the said washer to move outwardly upon the breaking of a spring of the sector lever, the compression means within the ball lever normally exerting less pressure against the inner walls of said washer than the springs of the sector lever exert against the outer walls of said washer, thereby releasing the latch bolt from contact against the bases of the sectors of said washer and compression means beneath said latch bolt to force it upwardly through the opening in the washer to seat within a recess provided on the sector lever, substantially as described.

5. In a steering controlling device of the class described, a sector lever, a ball lever mounted on said sector lever at its support and co-axially therewith, springs, positioned on said sector lever, adapted for compression between said sector lever and said ball lever, an opening within the ball lever, a cupped washer of two equal sectors positioned in said opening, said washer having an opening in the base thereof, a latch bolt normally positioned beneath the base of said washer, compression means positioned within said lever to cause the sectors of said washer to move outwardly upon the breaking of a spring of the sector lever, the compression means within the ball lever normally exerting less pressure against the inner walls of said washer than the springs of the sector lever exert against the outer walls of said washer, thereby releasing the latch bolt from contact against the bases of the sectors of said washer, compression means beneath said latch bolt to force it upwardly through the opening in the washer to seat within a recess provided on the sector lever and means to limit the outward movement of the sectors of said washer, substantially as described.

In testimony whereof I affix my signature.

JOSEPH HOFFMAN.